United States Patent [19]
Snow et al.

[11] Patent Number: 5,379,585
[45] Date of Patent: Jan. 10, 1995

[54] HYDRAULIC CONTROL SYSTEM FOR A JET ENGINE NOZZLE

[75] Inventors: Barton H. Snow, Wyoming; David M. Leighton, Loveland; Michael J. Steckler, Cincinnati, all of Ohio

[73] Assignee: General Electric Company, Cincinnati, Ohio

[21] Appl. No.: 86,069

[22] Filed: Jul. 6, 1993

[51] Int. Cl.6 .............................. F02K 1/00
[52] U.S. Cl. ........................ 60/204; 60/232; 60/242
[58] Field of Search .......... 60/204, 228, 230, 232, 60/233, 242, 271; 91/532; 239/265.33, 265.35

[56] References Cited

U.S. PATENT DOCUMENTS

| | | | |
|---|---|---|---|
| 3,979,908 | 9/1976 | Alderson | 60/422 |
| 4,034,563 | 7/1977 | Orth | 60/422 |
| 4,070,857 | 1/1978 | Wible | 60/422 |
| 4,437,307 | 3/1984 | Budzich | 60/427 |
| 4,608,822 | 9/1986 | Fondacci et al. | 60/242 |
| 4,669,363 | 6/1987 | Kreth et al. | 91/516 |
| 4,994,660 | 2/1991 | Hauer | 60/232 |
| 5,267,436 | 12/1993 | Wood | 60/232 |

Primary Examiner—Louis J. Casaregola
Attorney, Agent, or Firm—Jerome C. Squillaro; Bernard E. Shay

[57] ABSTRACT

A method of controlling a system is adapted to control flow to throat nozzle and vectoring nozzle actuators. The method comprises the steps of summing a plurality of signals representative of flow to the vectoring nozzle actuators with a signal representative of flow to the throat nozzle actuators to generate a total hydraulic flow signal. The total flow signal is then compared to a signal representative of total pump output to generate a reserve signal. Finally, a scaled rate limit signal is generated from the reserve signal and multiplied by predetermined ratio signals such that the ratio signals are limited by the difference between pump output and pump demand.

20 Claims, 3 Drawing Sheets

HYDRAULIC CONTROL SYSTEM FOR A JET ENGINE NOZZLE

The present invention relates, in general to jet engine hydraulic systems and, more particularly, to a means of managing the output of a hydraulic pump to a plurality of actuation systems.

BACKGROUND OF THE INVENTION

The General Electric F110-100 engine uses an oil operated nozzle hydraulic pump. The pump, all actuators, and all hydraulic lines are filled with engine lube oil at high pressure. Convergent/divergent nozzles have, in serial flow relationship, a convergent section, a throat, and a divergent section. The exhaust nozzles of such engines use convergent/divergent flaps with associated seals between the flaps to define the flow path of their respective sections. When converted to an axisymmetric nozzle, an actuation system is added to the divergent flaps of the nozzle to deflect the exhaust gas by any amount and in any desired direction from the engine counterline. The flaps and seals aerodynamically control the exhaust flow to transform the pressure and thermal energy of the engine exhaust discharge airflow into velocity and forward thrust for the engine.

Present day hydraulic systems have a pumping supply which is able to meet the needs of the actuation systems. This is accomplished by sizing the supply to be equal to the sum of the needs of each actuation system. Unfortunately, this approach produces a large pump, tanks, and coolers when designed for several high capacity actuation systems.

It is therefore highly desirable and an object. of the present invention to provide a means of managing the output of a hydraulic pump to a plurality of actuation systems wherein the size of the pump, tanks, and coolers can be reduced, without sacrificing system performance.

Another object of the present invention is to provide such a means of managing the output of a hydraulic pump to a plurality of actuation systems using priority logic to define which actuators receive flow, and which must receive reduced or no flow to prevent a demand in excess of the pump capacity.

Another object of the present invention is the provision of using this system whenever the total flow requirements of the actuation systems can exceed the capacity of the pump. The present invention, therefore, is particularly adaptable for use with a system having an axisymmetric vectoring exhaust nozzle (AVEN). The priority system for the pump flow can be used to optimally determine hydraulic priority for an AVEN system.

These objects and other features and advantages will become more readily apparent in the following description when taken in conjunction with the appended drawings.

SUMMARY OF THE INVENTION

The present invention permits each actuation system to operate at design actuation speeds, up to the capacity of the pump, but provides for sharing at momentary reduced performance, and for priority of the pump output for defined needs. The result is a smaller hydraulic pump, tank, and cooling system with no discernible sacrifice in system performance.

The present invention has been developed to fulfill the needs noted above. Briefly, in accordance with one aspect of the present invention, a method of controlling a system is adapted to control actuation flow to a throat nozzle actuation system and a vectoring nozzle actuation system. The method comprises the steps of summing a plurality of signals representative of flow to the vectoring nozzle with a signal representative of flow to the throat nozzle to generate a total flow signal. The total flow signal is then compared to a signal representative of total pump output to generate a reserve signal. Finally, a scaled rate limit modifier is generated from the reserve signal and multiplied by predetermined ratio signals such that the ratio signals are limited by the difference between pump output and pump demand.

In the drawings as hereinafter described, a preferred embodiment is depicted; however, various other modifications and alternative constructions can be made thereto without departing from the true spirit and scope of the invention.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
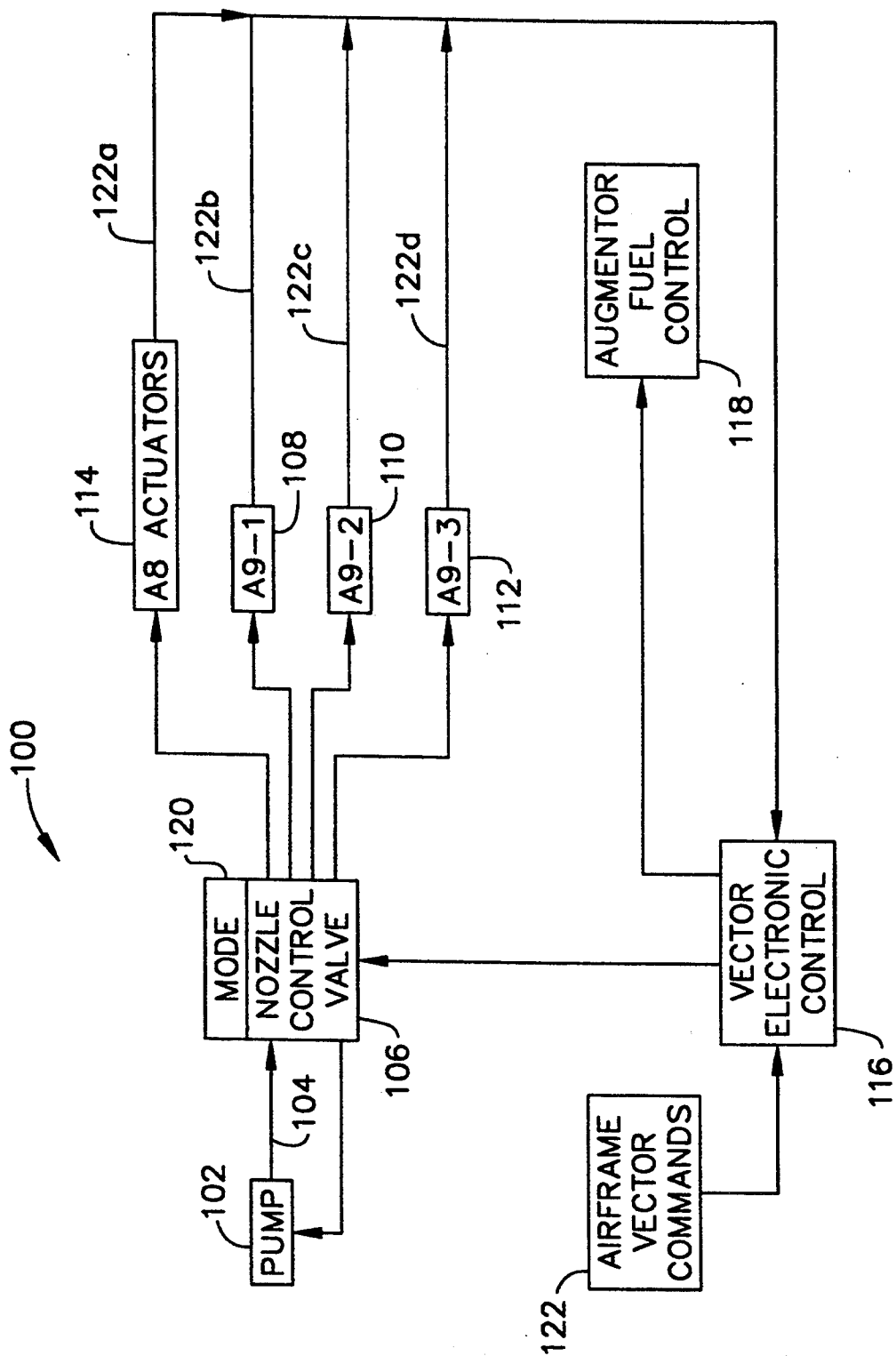
FIG. 1 is an overall configuration of an AVEN hydraulic control system which uses the flow management concept of the present invention.

Referring to FIG. 1, there is illustrated an overall configuration of an AVEN hydraulic control system 100 which uses the concept of flow management of the present invention. The concept of flow management of the present invention is to share the output of the hydraulic supply in an effort to keep the size of the hydraulic pump 102 as small as possible. This has the advantages of reducing heat generation, reducing tankage, and lowering system weight, without compromising performance of the system 100. Furthermore, an actuation system may be added to divergent flaps of an axisymmetric nozzle to deflect exhaust gas by any amount and in any desired direction from engine counterline. Control of divergent gas flaps and vectoring may be separately actuated. Finally, additional engine actuation systems may be included without departing from the scope of the invention.

In FIG. 1, hydraulic pump 102 provides a constant pressure supply of hydraulic fluid along line 104 in a manner common in the art. Nozzle control valve 106 contains four electrohydraulic servo valves which port hydraulic fluid individually to each vector actuator of a vectoring nozzle actuation system, that is, the A9 system, including vector actuators 108, 110, and 112, and to a throat nozzle actuation system, that is, the A8 actuation system, as indicated by block 114. The total maximum flow demands of the total actuation system exceeds the capacity of the pump 102. Consequently, vector electronic control 116 provides logic and management of the system 100 using airframe vector commands 122, logic from inputs, and feedbacks 122a, 122b, 122c, and 122d to control the flow of hydraulic fluid by varying the electrical current inputs to each of the electrohydraulic servo valves in the nozzle control valve 106. Vector electronic control 116 also controls engine augmenter fuel flow 118. By the use of holds, and delays in changes of augmenter fuel flow, the system can hold or delay demands for A8 actuation at times when the A9 system requires flow.

Continuing with FIG. 1, the nozzle control valve 106 also contains a hydraulic mode selector 120 which enables or disables the A9 system in response to cockpit commands, or fault logic contained in the vector electronic control. The vector control and logic 116, further illustrated in the remaining figures, allows for management of available hydraulic flow, in accordance with the present invention. The present invention provides for a method of controlling multiple hydraulic loads of pump 102, by generating control signals for maintaining total flow of hydraulic fluids and controlling rates of change of each of the multiple hydraulic loads in response to the control signals to optimize capacity of the pump.

Figure 2:
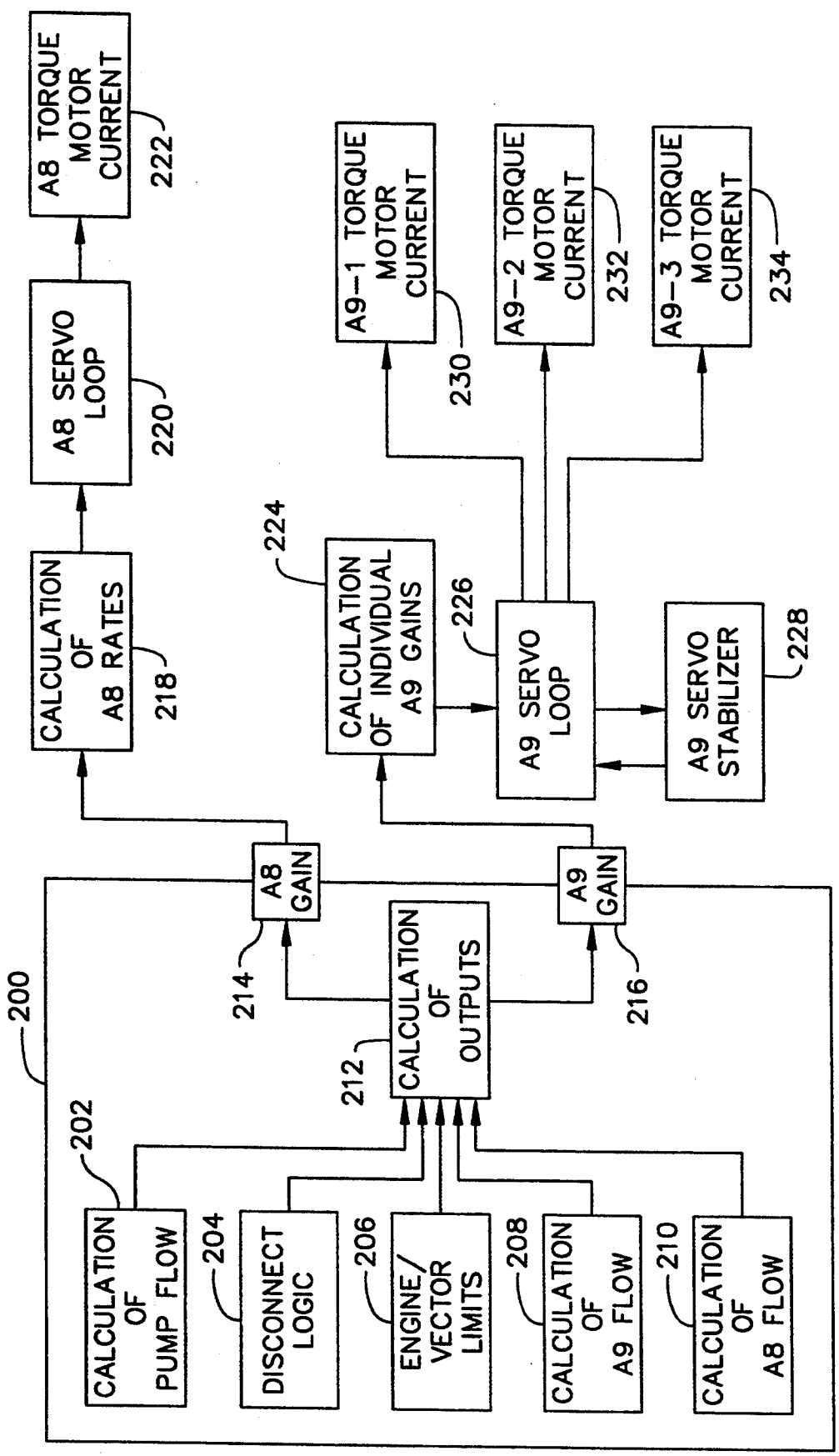
FIG. 2 is a block diagram of the logic flow of the present invention.

Referring now to FIG. 2, the overall definition of the flow management concept of the present invention is illustrated in block diagram form. Block 200 represents the calculations necessary to ultimately determine A8 and A9 gains. Although the present invention illustrates and describes determination of pump flow by using pump flow calculations, it will be obvious to those skilled in the art that pump flow may be determined in any of a variety of ways, including by calculations or measurements, without departing from the scope and concept of the invention.

Within the calculations block 200, block 202 represents a pump flow calculation; block 204 represents a disconnect logic calculation, which interrupts the calculation of A9 flow whenever the A9 system is disabled. Block 206 represents engine and vector limit calculations, which include proximity to fan stall, control of A9/A8 nozzle expansion ratio, side thrust, and angular vector limits; block 208 represents A9 flow calculations, calculated from the displacement rate of each A9 actuator and the direction of stroke of each actuator; and block 210 represents A8 flow calculations, calculated for all A8 actuators as a group, since all of the A8 actuators have identical stroke and direction. All of the calculations from calculation block 200 are provided to output calculation block 212 which calculates A8 and A9 flow gain limits 214 and 216, respectively.

Continuing with FIG. 2, the A8 flow gain limit 214 is used at block 218 to calculate A8 rates or actuator stroke and generate outputs for an A8 servo loop at block 220. At block 218, the product of A8 rate demand and A8 flow gain provides a rate demand signal which is used in the A8 servo loop of block 220 to generate an A8 torque motor current output 222. The A8 torque motor current output 222 is provided to an A8 electrohydraulic servo valve in the nozzle control valve 106 of FIG. 1.

The A9 flow gain limit 216 from the output calculation block 212 is provided to block 224 where the individual A9 gains are calculated for each A9 actuator. The A9 rates calculated for each A9 actuator are then proportioned among the three A9 actuators in proportion to the load limited rate demand for each actuator. The output of block 224 is the demanded position for each A9 actuator. The value is switched to the sensed position whenever vectoring has been discontinued. The output of block 224 is provided to an A9 servo loop block 226. The output of block 226 is provided to an A9 servo stabilization block 228 which provides servo stabilization. The output of block 228 is then returned to block 226 as an input. The A9 servo loop block 226 then provides A9 torque motor current outputs for each of the three A9 actuators 108, 110, and 112 of FIG. 1, as indicated by output blocks 230, 232, and 234, respectively, of FIG. 2.

As shown in FIG. 2, the calculated A8 gain 214 is used to generate outputs for the A8 servo loop at block 220. At block 218 of FIG. 2, A8 rates are calculated. Specifically, the A8 rate demand or limit input is multiplied with the A8 flow gain to produce a rate demand signal. The rate demand signal is applied to the A8 servo loop of block 220 in FIG. 2. The A8 servo loop allows for the A8 gain multiplier to be used to vary or influence the A8 torque motor current. The rate demand signal output is used by the servo loop to provide the current for the A8 electrohydraulic servo valve in the nozzle control valve 106 of FIG. 1. It is possible to use an output to slow down augmentor fuel changes when the A8 gain is low, thus reducing the use of hydraulic fluid for A8 changes caused by augmentor fuel changes. An augmentor fuel metering valve regulator, substantially identical to that used by the General Electric F110-100 engine is controlled at varying rates so that augmentor changes are slowed when vectoring is commanded, allowing more fluid availability for the vectoring system. The output then, is the demanded position and rate of change of position of the augmentor fuel valve 118 of FIG. 1.

At block 224, the A9 rates for each A9 actuator are calculated and proportioned among the three A9 actuators in proportion to the load limited rate demand for each actuator. For purposes of description only, the number of A9 actuators is shown herein in the drawings as being three. However, it will be obvious to those skilled in the art that the number of A9 actuators can vary, according to system requirements.

The airframe vector commands 122 to the vector electronic control 116, shown in FIG. 1, result in a demanded position of each of the three vector actuators, 108, 110, 112, of FIG. 1. As the result of calculations in block 200 of FIG. 2, the gains and the limiting rates of motion of each actuator are defined and provided as an input to the A9 servo loop shown as block 226 in FIG. 2. At block 226, the demand is compared to the actual to a create position error. The gain may then be multiplied to create a conditioned A9 signal error for each actuator 108, 110, and 112. The conditioned A9 signals can then be delivered to the nozzle control valve electrohydraulic servo valve located in the nozzle control valve 106 of FIG. 1. A conditioned A9 signal error may also be applied as an input to block 228 of FIG. 2, to provide servo stabilization.

Figure 3:
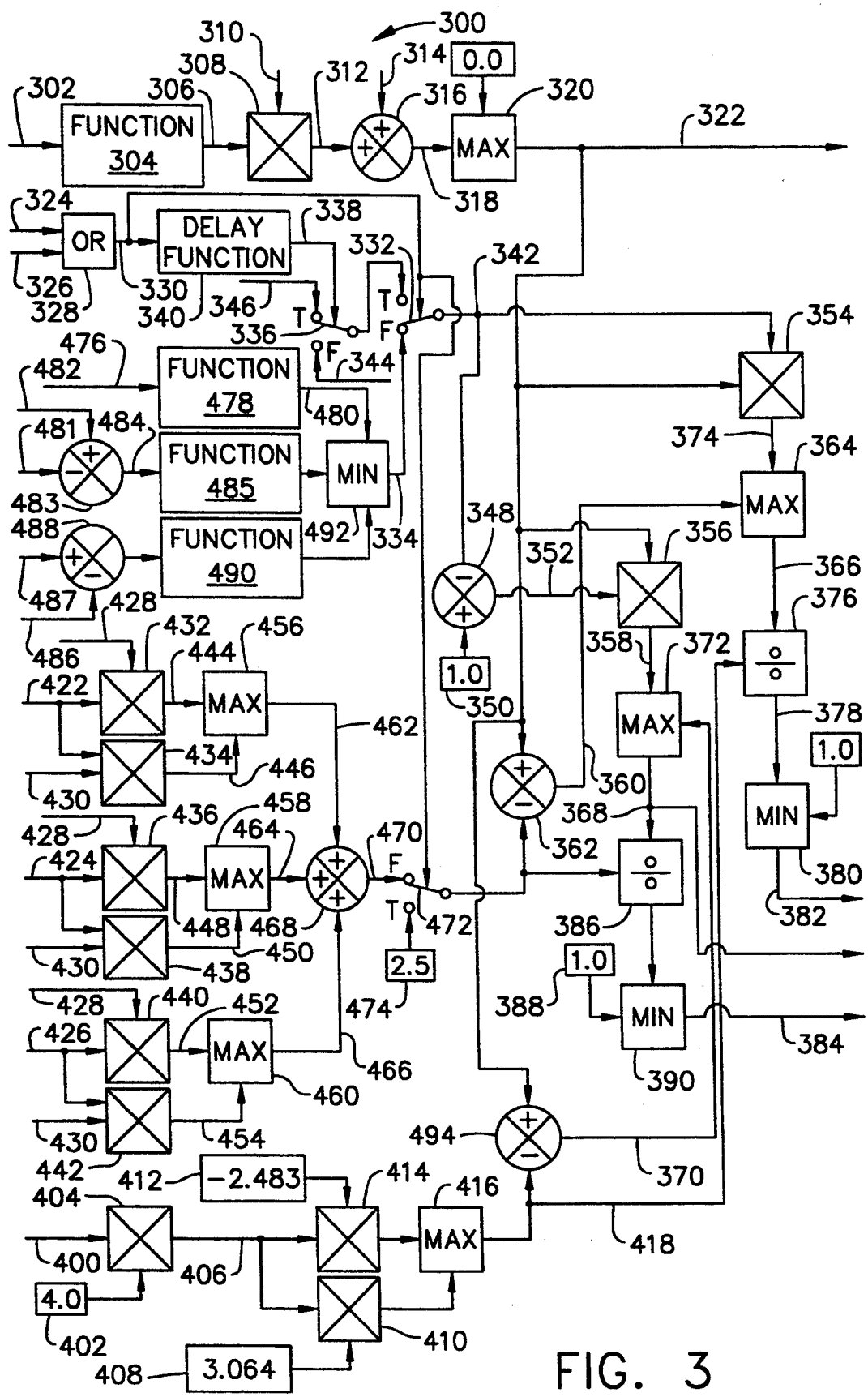
FIG. 3 is a schematic block diagram for providing details of variable gain calculations based on fluid flow calculations, for both the pump and the actuators, as shown in FIG. 2.

Referring now to FIG. 3, block 200 of FIG. 2 is described in detail. In FIG. 3, gains are proportioned relative to the current usage of pump flow, and output. A selected core RPM signal 302 is fed to a function block 304. The function block 304 calculates maximum available pump output flow as a function of RPM. The calculation of function block 304 assumes the maximum stroke position of the swash plate of the variable pump.

Alternatively, the actual plate angle may be used, with more complex calculations. An output 306 is fed to a multiplier 308, which permits a multiplication by a multiplier factor 310, which is preferably set at a nominal 0.95 to allow a selectable flow margin. A flow calculation along line 312 is further modified by an adjustment factor 314 at summing junction 316. This allows a fixed amount of flow to be added or subtracted. The resultant sum 318 goes to a maximum selector 320 which will not permit a less than zero output. A flow total along line 322 is the available oil flow for actuation.

Continuing with FIG. 3, first and second logical flags 324 and 326 are fed into an OR function 328. An output flag 330, from the OR function 328 is used to set a position for switch 332. The first flag 324 is a flag generated by the engine control to disable vectoring as a result of fault recognition. The second flag 326 is a flag received by the engine control from the flight control allowing the flight control to disable vectoring. The output of switch 332 is the percentage of pump flow reserved for operating the A8 system. When both logical flags 324 and 326 are false, vectoring is permitted and the switch 332 is set to false. In this position, the pump flow reserved for the A8 system becomes the output of the flow priority schedules, as described in more detail below with reference to output along line 334.

When either logical flag 324 or 326 is true, vectoring is not permitted and the switch 332 is set to true. In this position, the pump flow reserved for the A8 system becomes the output of switch 336. Switch 336 is positioned by the output signal along line 338 of a delay function 340. The delay function is such that the output signal 338 is equivalent to the input signal 330 except following a transition in states from false to true of signal 330. Following such a transition, a predetermined time period, such as two seconds, is allowed to elapse before output signal 338 is transitioned from false to true. As a result of this delay, when switch 332 changes from false to true, reserved A8 pump flow at location 342, output from the switch 336, is set to a first signal 344 for a predetermined time period, again such as two seconds, after which the pump flow output signal 342 is set equal to a second signal 346. The first signal 344 has a smaller value than the second signal 346, thus momentarily reserving more pump flow for the A9 system following a transition to the vector disable state. This allows the A9 system two seconds to center the nozzle prior to transferring a higher percentage of the flow over to the A8 system.

Continuing with FIG. 3, a calculation of the flow demanded by the A8 and A9 actuators is calculated. The percentage pump flow reserved for actuation of the A8 system, indicated by the output signal 342, is fed into summing junction 348 where it is subtracted from unity at unity block 350, to generate the percentage of pump flow reserved for actuation of the A9 system, indicated by signal 352.

Output signal 342 is also fed into a multiplier 354, where it is multiplied with the total pump flow available for actuation, indicated by reference number 322. Output 374 of the multiplier 354 becomes the pump flow reserved for actuation of the A8 system. In a similar manner, the flow total output along line 322 and the pump flow reserved for actuation output along line 352 are fed into a multiplier 356 to generate a signal along line 358, indicative of the pump flow reserved for actuation of the A9 system.

An output signal along line 360 from summing junction 362 indicates the pump flow available for actuation of the A8 system if the A9 system were to receive all the pump flow required to satisfy each of the A9 actuator rate demands. This signal 360 is compared with the output 374 of the multiplier 354 at a maximum select function 364. The larger of these two signals becomes an output signal along line 366, indicative of the pump flow allocated for actuation of the A8 system. Likewise, an output signal along line 368 is the pump flow allocated for actuation of the A9 system and is obtained by selecting the larger of the total pump flow available for actuation of the A9 system if the A8 system were to receive all the pump flow required to satisfy its rate demand, which is indicated by output 370, or the pump flow reserved for actuation of the A9 system, as determined at maximum select function 372.

Continuing with FIG. 3, a signal along line 418 is the pump flow being requested by the A8 system and is divided at divider function 376 into the amount of pump flow allocated for actuation of the A8 system, to obtain a signal along line 378 indicative of the ratio of pump flow available for actuation of the A8 system to the flow demand of the A8 system. This signal 378 is then fed into a minimum select function 380 to limit output signal 382 to one. Similarly, output signal 384 is obtained by dividing at divider function 386 the amount of pump flow allocated for actuation of the A9 system by the pump flow being requested by the A9 system, and then limiting the output to one through a reference signal 388 at minimum select function 390. Output signals 382 and 384 are therefore the actuator rate gain terms which, when multiplied with the original A8 and A9 rate demands, respectively, will produce new actuator rate demands that will not require more pump flow than the system is capable of delivering.

Continuing with FIG. 3, engine limits are recognized, and gains are changed to correspond thereto. An A8 actuator rate signal 400, a measure of the actual rate of displacement, is multiplied by a reference signal 402, such as, for example, a value of 4.0, referencing the number of A8 actuators at multiplier 404. An output 406 of the multiplier 404 is then multiplied with actuator head area 408, which has a value of, for example, 3.064, at multiplier 410, and with a negative of actuator rod area 412, such as −2.483, at multiplier 414. The outputs of the two multipliers 410 and 414 are then fed into maximum select function 416 to produce the output signal 418 indicative of the pump flow required by the A8 system to achieve actuator rate demand. Reference signal multiplier 402 is required in the calculation since there are four A8 actuators in the system. The negative sign on the rod area is required to produce a positive output from the multiplier 414 when the actuator is being demanded to retract. That is, when the actuator rate demand is negative and flow is into the rod side of the actuator. As a result, one of the two output signals from multipliers 410 and 414 will be negative, and the other will be positive. The maximum selector 416 will always select the positive value to produce the appropriate flow demand value along line 418.

In a similar fashion, each of the three A9 actuator rates indicated as inputs 422, 424, and 426, are multiplied with the A9 actuator head area 428 and the negative of the A9 actuator rod area 430, at multipliers 432, 434, 436, 438, 440, and 442 to produce current volumetric flow outputs 444, 446, 448, 450, 452, and 454, respectively. These outputs are then paired and fed into maximum select functions 456, 458, and 460 to produce the individual current flow 462, 464, and 466 of each A9 actuator. These current flow are fed into a summing junction 468 to produce a total pump flow demand 470 of the A9 system. The total A9 flow demand is fed into the false position of a logical switch 472. Each A9 actuator is calculated independently of the others because they are independent. The A8 actuators are paralleled, as all have the same stroke and direction. The calculation technique herein permits a change in the number of A8 and/or A9 actuators.

Continuing with FIG. 3, the output flag 330, which is true when vectoring is not permitted and false when vectoring is permitted, is used to set the switch 472 position. When the output flag 330 is false, vectoring is permitted, and the output of the summing junction 468 is the pump flow required by the A9 system to achieve the actuator rate demand. When the output flag is true, the output of a reference signal 474 is the pump flow required by the A9 system to achieve the actuator rate demand. The reference signal 474 is required to reserve a small amount of flow, for example 2.5, so that the A9 system can remain properly positioned when vectoring is not permitted.

Continuing with FIG. 3, an error signal 476, representing the proximity of the engine to fan stall, is fed into a function block 478 to produce an output 480, indicative of the percentage of the total pump flow to be reserved for actuation of the A8 system based on the error 476. The function block 478 is a schedule which biases a larger flow percentage toward the A8 system as the error signal 476 increases.

In FIG. 3, nozzle area ratio sensed position 481 is subtracted from nozzle area ratio demand 482, at summing junction 483. Output 484 of the summing junction 483 is the nozzle area ratio position error and is fed into a function block 485 to produce an output signal indicative of the percentage of total pump flow reserved for the A8 system based on nozzle area ratio area. The function block 485 is a schedule that biases more flow away from the A8 system as the area ratio error increases.

Similarly, sensed nozzle vector angle 486 is subtracted from nozzle vector limit 487, at summing junction 488. The output of the summing junction 488 is fed into a function block 490 to produce an output signal indicative of the percentage flow reserved for the A8 system based on vector position relative to the vector limit. The function block 490 is a schedule that biases more flow away from the A8 system as the nozzle vector angle approaches the nozzle vector limit.

The reserved A8 flow percentages from blocks 480, 485, and 490 are then fed into a minimum select function 492, to give higher priority to the A9 system. Output 334 therefore becomes the percentage of the total pump flow to be reserved for actuation of the A8 system. At summing junction 494, the A8 system's flow demand 418, is subtracted from the total pump flow available, indicated by reference number 322, to produce output 370, which represents the total pump flow available for actuation of the A9 system if the A8 system were to receive all the pump flow required to satisfy its rate demand. Likewise, the A9 system's flow demand is subtracted from the total available pump flow 322 to produce output signal 360, which is the amount of pump flow available for actuation of the A8 system if the A9 system were to receive all the pump flow required to satisfy the rate demands of each A9 actuator.

In the Figures, there is illustrated an actuation system adapted to control a throat nozzle actuation system and a vectoring nozzle actuation system. A total pump output flow capability signal 322 is generated. Actuation flow signals are summed, representative of actuation flow to the vectoring nozzle actuation system. The vectoring nozzle actuation system flow signal 470 is compared to the total pump output flow capability signal 322, to generate an available flow signal 360 for actuation of a throat nozzle. The throat nozzle actuation system flow signal 418 is compared to the total pump output flow capability signal 322 to generate an available flow signal 370 for actuation of the vectoring nozzle.

A first reserve flow signal 358 representative of the amount of actuation flow to be reserved for actuation of a vectoring nozzle, and a second reserve flow signal 374 from the output of multiplier 354 representative of the amount of actuation flow to be reserved for actuation of a throat nozzle, are generated from predetermined prioritization logic, such that the summation of the two reserve signals does not exceed the flow capacity of the pump. The first reserve flow signal is compared to an available flow signal 360 of the vectoring nozzle, and the maximum of the first reserve flow signal and the available flow signal is selected to determine an allocated flow signal 368 indicative of flow allocated for actuation of the vectoring nozzle. Similarly, the second reserve flow signal is compared to an available flow signal 370 of the throat nozzle, and the maximum of the second reserve flow signal and the available flow signal is selected to determine an allocated flow signal 366 indicative of flow allocated for actuation of the throat nozzle.

A vectoring nozzle rate gain signal is then generated for the vectoring nozzle by taking the ratio of the allocated flow signal 368 of the vectoring nozzle to the signal representative of the actuation flow 470 of the vectoring nozzle. Likewise, a throat nozzle rate gain signal is generated for the throat nozzle by taking the ratio of the allocated flow signal 366 of the throat nozzle to the signal representative of the actuation flow 418 of the throat nozzle. Scaled rate demand signals consistent with flow capacity of the pump are then generated by multiplying the vectoring nozzle rate gain signal and the throat nozzle rate gain signal by rate signals used to determine actuation flows.

While preferred embodiments of the present invention have been shown and described herein, it will be obvious to those skilled in the art that such embodiments are provided by way of example only. Numerous variations, changes, and substitutions will now occur to those skilled in the art without departing from the invention. For example, additional engine actuation systems, such as engine core stators or reversers, may be included without departing from the scope of the invention. Priorities of each of the actuators may be varied to meet and satisfy the additional engine and flight demands. Additionally, limit signals may be included without departing from the scope and concept of the invention. Finally, the priorities of each actuation system may be varied to meet and satisfy other engine or flight demands, without departing from the scope and content of the invention. Accordingly, it is intended that the invention be limited only by the spirit and scope of the appended claims.

We claim:

1. A method for controlling an actuation system adapted to control throat nozzle actuators and vectoring nozzle actuators, the method comprising the steps of:
   summing a plurality of signals representative of flow to the vectoring nozzle actuators with a signal representative of flow to the throat nozzle actuators to generate a total flow signal;
   comparing the total flow signal to a signal representative of maximum pump output to generate a reserve signal;
   generating a scaled rate limit signal from the reserve signal; and
   multiplying the scaled rate limit signal by predetermined ratio signals, which ratio signals are limited by the difference between pump output and pump demand of a hydraulic pump, to provide a scaled demanded flow consistent with flow capability of the pump.

2. A method for controlling an actuation system adapted to control throat nozzle actuators and vectoring nozzle actuators as claimed in claim 1 further comprising the step of calculating maximum pump flow capability.

3. A method for controlling an actuation system adapted to control flow to throat nozzle actuators and vectoring nozzle actuators as claimed in claim 1 further comprising the step of measuring maximum pump flow capability.

4. A method for controlling an actuation system adapted to control flow to throat nozzle actuators and vectoring nozzle actuators as claimed in claim 1 further comprising the step of adding an actuation system to divergent flaps of an axisymmetric nozzle to deflect exhaust gas by any amount and in any desired direction from engine counterline.

5. A method for controlling an actuation system adapted to control flow to throat nozzle actuators and vectoring nozzle actuators as claimed in claim 4 wherein control of divergent gas flaps and vectoring are separately actuated.

6. A method for controlling an actuation system adapted to control flow to throat nozzle actuators and vectoring nozzle actuators as claimed in claim 5 wherein additional engine actuation systems are included.

7. A method for controlling an actuation system adapted to control flow to throat nozzle actuators and vectoring nozzle actuators as claimed in claim 1 wherein priorities of each of the actuators are varied to meet and satisfy additional engine and flight demands.

8. A method for controlling an actuation system adapted to control a throat nozzle actuation system and a vectoring nozzle actuation system, the method comprising the steps of:
   generating a total pump output flow capability signal;
   summing a plurality of actuation flow signals representative of actuation flow to the vectoring nozzle actuation system to generate a vectoring nozzle actuation system flow signal;
   comparing the vectoring nozzle actuation system flow signal to the total pump output flow capability signal; and
   generating an available flow signal for actuation of a throat nozzle of the throat nozzle actuation system.

9. A method for controlling an actuation system adapted to control a throat nozzle actuation system and a vectoring nozzle actuation system as claimed in claim 8 further comprising the steps of:
   comparing a throat nozzle actuation system flow signal to the total pump output flow capability signal; and
   generating an available flow signal for actuation of a vectoring nozzle of the vectoring nozzle actuation system.

10. A method for controlling an actuation system adapted to control a throat nozzle actuation system and a vectoring nozzle actuation system as claimed in claim 8 further comprising the step of providing predetermined prioritization logic.

11. A method for controlling an actuation system adapted to control a throat nozzle actuation system and a vectoring nozzle actuation system as claimed in claim 10 wherein the step of providing predetermined prioritization logic further comprises the steps of:
   generating a first reserve flow signal representative of the amount of actuation flow to be reserved for actuation of a vectoring nozzle of the vectoring nozzle actuation system; and
   generating a second reserve flow signal representative of the amount of actuation flow to be reserved for actuation of a throat nozzle of the throat nozzle actuation system.

12. A method for controlling an actuation system adapted to control a throat nozzle actuation system and a vectoring nozzle actuation system as claimed in claim 11 further comprising the step of summing the first and second reserve flow signals.

13. A method for controlling an actuation system adapted to control a throat nozzle actuation system and a vectoring nozzle actuation system as claimed in claim 12 wherein the summation of the first and second reserve flow signals is less than the flow capacity of the pump.

14. A method for controlling an actuation system adapted to control a throat nozzle actuation system and a vectoring nozzle actuation system as claimed in claim 12 wherein the summation of the first and second reserve flow signals is equal to the flow capacity of the pump.

15. A method for controlling an actuation system adapted to control a throat nozzle actuation system and a vectoring nozzle actuation system as claimed in claim 11 further comprising the steps of:
   comparing the first reserve flow signal to an available flow signal of the vectoring nozzle; and
   selecting the maximum of the first reserve flow signal and the available flow signal to determine an allocated flow signal indicative of flow allocated for actuation of the vectoring nozzle.

16. A method for controlling an actuation system adapted to control a throat nozzle actuation system and a vectoring nozzle actuation system as claimed in claim 15 further comprising the steps of:
   comparing the second reserve flow signal to an available flow signal of the throat nozzle; and
   selecting the maximum of the second reserve flow signal and the available flow signal to determine an allocated flow signal indicative of flow allocated for actuation of the throat nozzle.

17. A method for controlling an actuation system adapted to control a throat nozzle actuation system and a vectoring nozzle actuation system as claimed in claim 16 further comprising the steps of:

generating a vectoring nozzle rate gain signal for the vectoring nozzle; and generating a throat nozzle rate gain signal for the throat nozzle.

18. A method for controlling an actuation system adapted to control a throat nozzle actuation system and a vectoring nozzle actuation system as claimed in claim 17 wherein the step of generating a vectoring nozzle rate gain signal for the vectoring nozzle comprises the step of taking a ratio of the allocated flow signal of the vectoring nozzle to a signal representative of actuation flow of the vectoring nozzle.

19. A method for controlling an actuation system adapted to control a throat nozzle actuation system and a vectoring nozzle actuation system as claimed in claim 18 wherein the step of generating a throat nozzle rate gain signal for the throat nozzle comprises the step of taking a ratio of the allocated flow signal of the throat nozzle to a signal representative of actuation flow of the throat nozzle.

20. A method for controlling an actuation system adapted to control a throat nozzle actuation system and a vectoring nozzle actuation system as claimed in 19 further comprising the step of generating scaled rate demand signals consistent with flow capacity of the pump.

* * * * *